United States Patent [19]

Langham

[11] 3,997,042
[45] Dec. 14, 1976

[54] AIRCRAFT ENGINE COUPLING

[75] Inventor: Stephen Langham, Indianapolis, Ind.

[73] Assignee: General Motors Corporation, Detroit, Mich.

[22] Filed: Nov. 5, 1975

[21] Appl. No.: 629,074

[52] U.S. Cl. .............................. 192/46; 192/56 F; 192/91 A; 192/104 F; 192/114 R
[51] Int. Cl.² ................. F16D 43/20; F16D 41/00; F16D 43/284
[58] Field of Search ................. 192/46, 56 F, 91 A, 192/104 F, 114 R

[56] References Cited

UNITED STATES PATENTS

| 2,683,512 | 7/1954 | Boice | 192/56 F |
| 2,700,443 | 1/1955 | Boice | 192/56 F |
| 3,205,986 | 9/1965 | Kramer | 192/56 F |
| 3,225,876 | 12/1965 | Dison | 192/56 F X |
| 3,249,187 | 5/1966 | McDowall | 192/46 X |
| 3,713,518 | 1/1973 | Hawkins | 192/46 |

Primary Examiner—Allan D. Herrmann
Attorney, Agent, or Firm—J. C. Evans

[57] ABSTRACT

A torque responsive coupling includes an intermediate coupling member with helical splines thereon selectively engageable with first and second axially spaced helically splined coupling discs connected respectively to an engine power shaft and to a gear reduction input shaft to a propeller. Each of the coupling disc splines is maintained in engagement with the splined portions of the intermediate coupling member by spring means to transmit power from the engine shaft to the propeller and the intermediate coupling member is responsive to a high negative torque from the propeller when the engine fails to shift axially to separate spline teeth for decoupling the engine shaft and propeller and cause a hydraulic lockout system to apply a force on the intermediate coupling member in opposition to the spring means to maintain the spline teeth decoupled to prevent ratcheting therebetween; the hydraulic lockout system includes a single piston unit indexed to control pressure balance ports and an exhaust valve for establishing the opposition force.

3 Claims, 4 Drawing Figures

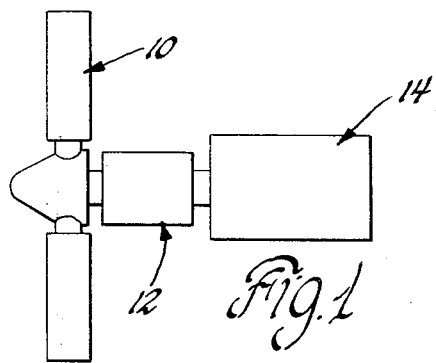
Fig. 1
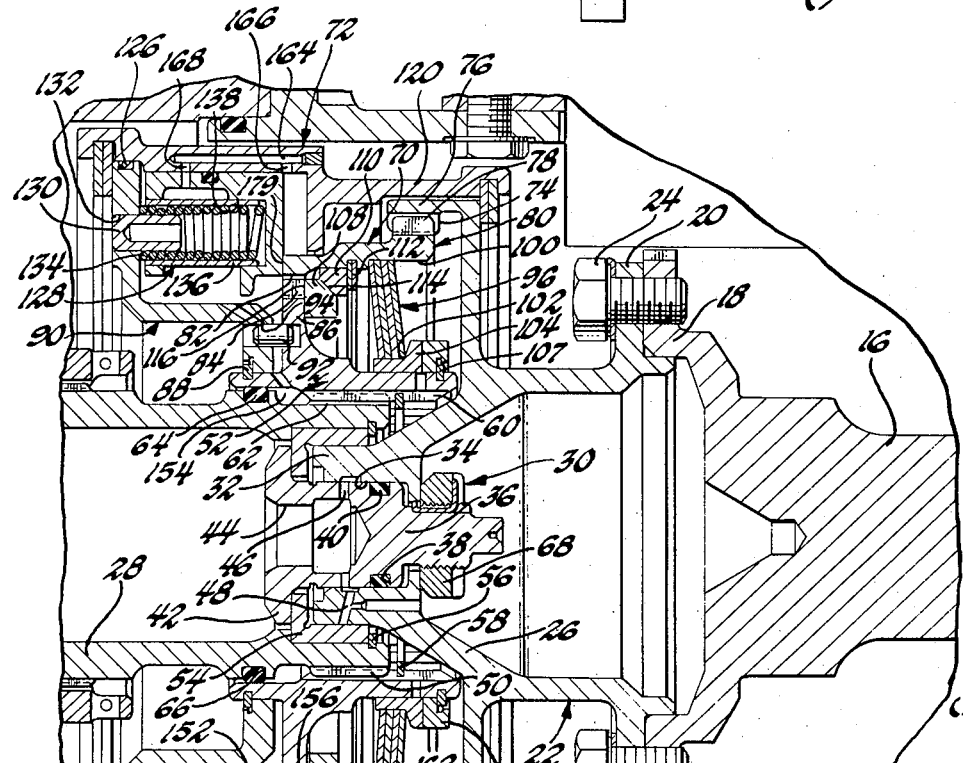
Fig. 2
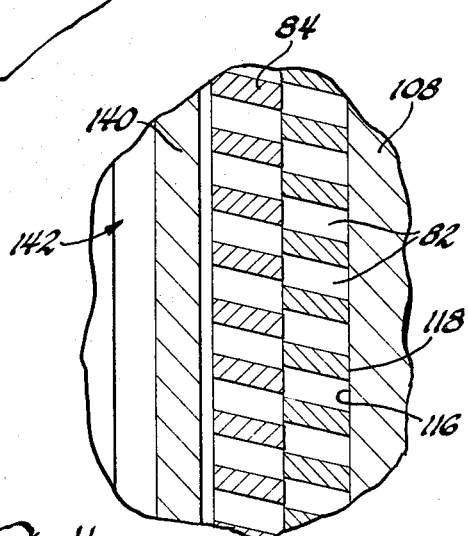
Fig. 3
Fig. 4

AIRCRAFT ENGINE COUPLING

The invention herein described was made in the course of work under a contract or subcontract thereunder with the Department of Defense.

This invention relates to couplings for connecting an engine power shaft to an aircraft propeller and operative to decouple the propeller from the engine power shaft upon imposition of a high negative torque transmitted to the engine from the propeller and wherein hydraulic means are operative in response to negative torque from the propeller to maintain splined teeth of the coupling spaced to prevent ratcheting therebetween and more particularly to an improved hydraulic lockout system operative under high negative torque conditions to maintain splined teeth completely separated through a wide range of speeds.

In gas turbine engines of the type used in aircraft it is necessary to couple the engine power shaft to the propeller through a torque responsive coupling operative to disconnect the engine power shaft from the propeller when the engined has failed and thus prevent power loss and drag which would otherwise be caused by the propeller driving a failed engine. One proposal to accomplish this objective is set forth in U.S. Pat. No. 3,249,187 issued May 3, 1966, to McDowall et al. It shows first and second coupling discs connected respectively to the engine power shaft and the gear reduction input shaft and further includes an intermediate coupling member having splined teeth thereon selectively engageable with spline teeth on the coupling discs and wherein a Belleville spring acts on the intermediate member to maintain a drive connection between the engine power shaft and the propeller under normal operating conditions. In the event of engine failure, negative torque produced by the propeller, negative torque being defined as power transmitted to the engine from the propeller, will cause the intermediate coupling member to shift axially against the Belleville spring until the splined teeth are separated from one another so as to decouple the propeller from the engine and thereby reduce power loss and drag which would otherwise be produced if the negative torque of the propeller were to drive the failed engine. It is recognized that a Belleville spring acting on the intermediate coupling member, will tend to shift the splined teeth from a decoupled position toward a coupled position when the speed of the propeller reaches a predetermined negative torque. Depending upon the speed of rotation of the propeller and the transmitted negative torque, it is possible for the splined teeth to ratchet as the Belleville spring returns the intermediate member from a decoupled to a coupled position. U.S. Pat. No. 3,225,876 to Dison discloses a coupling in a transmission case filled with hydraulic fluid to produce hydraulic pressure within a pair of opposed centrifugal cups which are filled with hydraulic fluid from the transmission house and operative in response to rotation of the coupling to impose a hydraulic imbalance on the intermediate member to maintain the spline teeth out of engagement.

An object of the present invention is to improve a coupling having two splined, shaft connected discs and a movable splined intermediate member biased by a Belleville spring to engage spline teeth on the discs and intermediate member during normal operation by means of a single hydraulically operated piston which can be added to existing coupling parts without modification thereof and be operated to produce a negative torque responsive, hydraulic force on the intermediate member to maintain splined teeth separated against ratcheting during a decoupling mode of operation.

Another object of the present invention is to improve a coupling for controlling power transfer between a propeller and a failed engine including a coupling having a pair of splined discs connected respectively to an engine power shaft and to a drive component to the propeller and an intermediate coupling member maintained under the control of a Belleville spring to locate splined teeth thereon in driving engagement with splined teeth of the splined discs to produce power transfer from an engine drive shaft to a propeller by the provision of an add-on hydraulic lock-out system including a single piston and passage means for balancing hydraulic fluid pressure thereacross during normal operation and further including means to produce a pressure imbalance across the piston in response to negative torque transfer from the propeller to the engine drive shaft upon engine failure thereby to cause the piston to maintain a positive hydraulic force on the intermediate coupling member after is has been shifted by negative torque transfer so as to overcome biasing action of the Belleville spring and maintain disengagement of spline teeth during a decoupled mode of operation.

Further objects and advantages of the present invention will be apparent from the following description, reference being had to the accompanying drawings wherein a preferred embodiment of the present invention is clearly shown.

FIG. 1 is a schematic representation of an aircraft power plant embodying the coupling of the present invention;

FIG. 2 is an enlarged, fragmentary sectional view showing the improved coupling and hydraulic lock system in an engaged position;

FIG. 3 is an enlarged fragmentary sectional view showing component parts of the improved coupling in a disengaged position; and FIG. 4 is an enlarged cross sectional view taken along the line 4—4 of FIG. 3 looking in the direction of the arrows.

Referring to FIG. 1, an aircraft power plant is shown including a variable pitched propeller 10 connected through a reduction gear unit and coupling case 12 to a gas turbine engine 14. The gas turbine engine 14 has an engine power shaft extension 16 with an end flange 18 thereon connected to an end flange 20 of a coupling disc 22 by means of a plurality of suitable connector elements representatively illustrated as screw elements 24. The coupling disc 22 has a radially inwardly convergent nose segment 26 thereon. A gear reduction input shaft 28 to the propeller 10 is piloted on the nose portion 26 by a connector assembly 30 that includes an axial extension 32 on the nose portion 26 having a central bore 34 therethrough in which is located a bolt 36 having a peripheral groove 38 therein that supportingly receives an O-ring seal ring 40 for sealing the bore 34. The bolt 36 includes head 42 with an opening 44 therethrough supplying lubricant to radial passageways 46 therein thence through a network of lubricant passageways 48 in the axial extension 32 to assure lubrication of a splined connection 50 that connects a second coupling disc 52 to the shaft 28.

A cup shaped cover 54 is located over the axial extension 32 and is retained on the shaft 28 at a shoulder thereon by a snap ring 56. A second larger diameter snap ring 58 spaced axially of ring 56 is located on a radially inwardly located plurality of spline teeth 60 on the coupling disc 52 to axially position a plurality of spline teeth 62 on shaft 28 in engagement with teeth 60. The splined connection 50 is sealed at its outboard end by an O-ring seal 64 located within a peripheral groove 66 at one end of the shaft 28. The bolt 36 has a nut 68 threadably received on the end thereof to secure it axially against the front face of the cover 54 so as to positively pilot the shaft 28 with respect to the nose portion 26 of the coupling disc 22.

The coupling discs 22, 52 are part of a coupling assembly 70 with component parts corresponding to the aforesaid McDowall et al coupling. It is associated with a hydraulic lockout system 72 to produce a positive couple between the shaft 16 and shaft 28 under normal operating conditions and a decoupling of the propeller 10 from a dead engine in response to a high negative torque transfer from the propeller 10 to the coupling 70 to avoid excessive propeller drag and power loss when the engine is dead. The hydraulic lockout system is configured to be included in association with the coupling assembly 70 without requiring redesign or rearrangement of the component parts thereof.

More particularly, the coupling assembly 70 includes an internal ring of spline teeth 74 on an outboard flanged extension 76 of the disc 22. The spline teeth 74 are operatively associated with a second set of external spline teeth 78 on one end of an intermediate coupling member 80 that has a second set of internal helical spline teeth 82 on an opposite end thereof. The spline teeth 82 are operatively associated with an external ring of helical spline teeth 84 on a radially outwardly directed flange 86 of the coupling disc 52.

The spline teeth 74 and spline teeth 78 extend completely around the flange 76 and coupling member 80, respectively. The internal helical spline teeth 82 and external helical spline teeth 84 likewise extend completely around the coupling member 80 and flange 86, respectively. The helical spline teeth 84, 86 are of the same hand and of the same lead. As disclosed, the helical spline teeth 82 are left hand as also are the helical spline teeth 84 left hand.

The coupling disc 52 is axially restrained by means of a snap ring 88 secured thereto and to a cup-shaped cover plate 90 of the hydraulic lockout assembly 72. The circumferential location of the disc 52 with respect to the plate 90 is provided by a dowel pin 92 directed through aligned bores 94 in the end plate 90 and the flange 86 as is best seen in FIG. 2.

The coupling member 80 is biased in a forward direction, which is to the left as seen in FIG. 2, by means of a stack of Belleville springs 96 having a radially outward periphery thereon seated within an internal shoulder 98 in a central bore 100 through the intermediate coupling member 80. The radially inboard end of the Belleville springs 96 is seated on a shoulder 102 formed on a ring 104 supported on the outer periphery of the coupling disc 52 and secured thereto by a locator ring 106 fastened to the end of the disc 52 by means of a snap ring 107.

Additionally, the bore 100 of the coupling member 80 has a pair of forward locater rings 108, 110 held therein by means of a snap ring 112. The locater rings 108, 110 have mutually engaging inclined surfaces 114 thereon to maintain a flat radial surface 116 on the ring 108 in engagement with the aft surface 118 on the internal helical spline teeth 82 for purposes to be discussed.

Under normal engine operating conditions the hydraulic lockout assembly 72 is hydraulically balanced so as to permit the stack of Belleville springs 96 to act on the intermediate coupling member 80 and shift it forwardly as shown in FIG. 2 to produce an intermeshed engagement between the helical spline teeth 82, 84 and the spline teeth 74, 78 thereby to provide a direct coupling between the shaft 16 and the shaft 28 to the propeller 10.

Under this mode of operation, the hydraulic lockout assembly 72 does not produce any opposing force of the coupling unit 70.

At this time, it is best to describe the hydraulic lockout assembly 72 for purposes of defining its balanced state under normal operating conditions as well as to define its function to overcome the normal coupling action of the set of Belleville springs 96 in the event that the engine 14 fails.

More particularly, the hydraulic lockout assembly 72 includes an annular outer housing 120 that is located in radially outwardly located surrounding relationship with the coupling unit 70. It is retained against the aft surface of the coupling disc 22 by means of snap rings 122. Snap rings 124 are secured to the opposite end of the annular outer housing 120 to define a stop surface and connection for securing the cup-shaped end cover plate 90 with respect to the housing 120. The plate 90 is sealed with respect to the housing 120 by an O-ring seal 126 supportingly located in a grooved periphery of plate 90.

The plate 90 supportingly receives a plurality of circumferentially spaced, spring biasing assemblies 128 each of which includes a locater pin 130 press fit in a bore 132 in the plate 90 to extend axially rearwardly. A compression spring 134 has one end supportingly received on the pin 130. It extends through a tubular housing 136 that is press fit in a forwardly located bore 138 on one end 140 of an axially movable lockout piston 142. The lockout piston 142 includes an annular peripheral portion 144 slidably supported within an axial bore 146 located internally of the housing 120. The piston 142 is sealed at its outer peripheral portion 144 by means of an O-ring seal 148 therein that is located in sealing engagement with the wall of the bore 146 as is best seen in FIGS. 2 and 3.

Together the end plate 90 and movable piston 142 define a hydraulic chamber 150 which is sealed by means of the O-ring seal 126, 148. An annular passage 152 is defined between a radially inwardly located edge of piston 142 located in close spaced relationship to the cup-shaped end plate 90. Oil flows to the chamber 150 through passage 152 from transmission cavity 154. A rear hydraulic fluid chamber 155 is formed between the rear face 156 of the piston 142 and a forwardly facing surface 158 on a radially inwardly directed flange portion 160 of the housing 120. The flange 160 includes a radially inwardly located edge 162 located in close spaced relationship to the outer surface of the intermediate coupling member 80 for escape of excess oil from cavity 155.

The annular housing 120 includes a pressure balance passage 164 having axially spaced side ports 166, 168 leading therefrom for equalizing oil pressure across piston 142. Pressure relief from the hydraulic chamber 155 is through an exhaust port 170 formed in the housing 120 and having oil flow thereacross under the control of a ball element 172 seated within an axial recess 174 formed in the periphery of wall 140. Axially spaced from the ball element is a second ball element 176 supported in a recess 178 at the front end of the piston 142 at the outer periphery thereof. It is slidably supported in a slot 180 formed in the outer annular member 120 axially and forwardly of the port 170 therein. The hydraulic lockout assembly 72 is included in association with the coupling assembly 80 to minimize the time period that the ends of the helical spline teeth 82, 84 are located adjacent one another during a decoupled mode therebetween to prevent ratcheting of the spline teeth because of the opposed biasing force produced by the stack of Belleville springs 96.

As mentioned above, during normal steady state engine operation the coupling 80 is transmitting power, in one working environment at speeds of 13,820 rpm, and the hydraulic lockout assembly 72 including the chambers 150 and 154 have an annulus of oil extending from the inside diameter of the forward surface 158 of flange 160 to the outside diameter of the piston 142 and also between the rear face of the end plate 90 and the surface 158. Any oil that leaves the rear part of the coupling 80 through the clearance defined by the edge 162, escapes along oil grooves extending axially of the rear internal bore of the housing 120.

The oil passage 164 in the housing 120 causes oil pressure on the forward side of the piston 142 within the chamber 150 to be balanced by the oil pressure in the chamber 155 acting on the rear face 152 of the piston 142.

The function of the three compression springs 134 is to assure that the rear face 156 of the piston 142 is always maintained in contact with a forward face 179 of the intermediate coupling member 80.

Under conditions where an engine fails and a large negative torque is applied from the propeller through the gear reduction input shaft 28 to the output shaft 16 of the engine, the load on the helical spline teeth 82, 84 forces the intermediate coupling member 80 to move aft or rearwardly and thereby overcome the forwardly acting force of the Belleville spring stack 96 which under normal operating conditions maintains the shaft coupled configuration of FIG. 2. As the intermediate coupling member 80 moves aft, the axially movable piston 142 is forced by the compression spring 132 to follow the intermediate coupling member 80. As the piston 142 moves rearwardly the outer periphery thereof will close the oil port 166. Simultaneously, with the closure of oil port 166, which interrupts the balance of pressure flow through the passage 164, the piston 142 will engage the ball element 172 to move it to uncover the exhaust passage 170 to cause oil on the aft side of the piston 142 to escape. However, the annulus of oil on the forward side of the piston 142 within the chamber 150 will remain and because of the speed of rotation of the hydraulic lockout assembly and the flange coupling disc 52 of the coupling assembly 80 as produced by the negative torque from the propeller, it will exert an unbalanced hydraulic force acting on the intermediate coupling member 80 against any tendency for the Belleville springs to shift the coupling member 80 into its coupled position.

As the helical splines 82, 84 move out of mesh into a separated relationship the force generated across them drops to zero at the output shaft 16. However, the hydraulic force on the piston 142 is sufficient to continue the rearward movement of the intermediate coupling member 80 until the piston 142 is brought to rest by engagement with the forward surface 158 on the flange 162 of housing 120. In this position, the helical spline ends are maintained completely out of contact and there is no ratcheting of the ends of the splines against one another.

The unbalanced pressure generated by the hydraulic lockout system 72 is entirely dependent upon the speed at which the coupling is rotated and as the rpm of the shaft 28 decreases a point is reached where the oil pressure on the piston 142 as produced by oil within the cavity 150 is less than the forward force exerted by the stacked Belleville springs 96. At this point the intermediate coupling member 80 begins to move in a forward direction and will mesh the spline teeth 82, 84. It has been determined that this will occur when the shaft 28 rotates at 6000 rpm. While some ratcheting will occur at this point, tests have confirmed that the coupling life is a function of the length of ratchet time and a total number of differential revolutions between the ratcheting members is significantly reduced as long as a positive hydraulic lockout is maintained between 13,820 and 6000 rpm of the shaft 28.

In the illustrated lockout arrangement 72 the piston 142 does not apply any load to the intermediate coupling member 80 until a maximum negative torque is reached to cause aft movement of the intermediate coupling member 80. This is assured by permitting an axial piston movement in the order of 0.08 inches before the pressure exhaust passage 170 is opened. It is also important to note that the time required to exhaust the oil behind the piston through the exhaust passage 170 must be maintained of short duration so there is a minimum delay in the application of full piston load. In the normal operating position the front face of the end cover 90 is pressed against the front snap rings 124 because of the oil pressure within the cavity 150. For this reason the end support groove for the snap rings is the axial reference position for the component parts of the hydraulic lockout assembly 72 and the coupling assembly 70. The location of the exhaust port 170 is referenced with respect to this surface as well as that of the port 166 leading to the balance pressure passage 164.

While the embodiments of the present invention, as herein disclosed, constitute a preferred form, it is to be understood that other forms might be adopted.

The embodiments of the invention in which an exclusive property or privilege is claimed are defined as follows:

1. A coupling assembly for separation of a propeller and reduction gear box from an engine drive shaft in response to a high negative propeller torque comprising: a first coupling member adapted to be connected to the engine drive shaft, a second coupling member adapted to be connected to the input to a reduction gear box for a propeller, an intermediate coupling member axially movable with respect to said first and said second coupling members, means for coupling said first and intermediate coupling members to permit axial movement therebetween while restraining relative rotation therebetween, torque responsive means for coupling said intermediate coupling member to said second coupling member to permit a controlled separation of said second and intermediate coupling members in response to a predetermined negative torque being applied to said second coupling member, said torque responsive means including a helical spline on both of said second and intermediate coupling members, means for preventing ratcheting of said helical splines upon separation of said second and intermediate coupling members, said last mentioned means including a single fluid piston having an abutment engageable with said intermediate coupling member to define an axial reference surface for maintaining a drive couple between said first, second and intermediate coupling members under normal operation, said last mentioned means further including means for applying a hydraulic pressure differential across said single fluid piston to apply a force on said intermediate coupling member in response to axial movement of said intermediate coupling member from a coupled relationship with said third coupling member wherein said helical splines thereon are maintained in a completely decoupled, non-ratchet position when said second and intermediate coupling members are separated from one another to disconnect the propeller gear box from the engine drive shaft.

2. A coupling assembly for separation of a propeller and reduction gear box from an engine drive shaft in response to a high negative propeller torque comprising: a first coupling member adapted to be connected to the engine drive shaft, a second coupling member adapted to be connected to the input to a reduction gear box for a propeller, an intermediate coupling member axially movable with respect to said first and said second coupling members, means for coupling said first and intermediate coupling members to permit axial movement therebetween while restraining relative rotation therebetween, torque responsive means for coupling said intermediate coupling member to said second coupling member to permit a controlled separation of said second and intermediate coupling members in response to a predetermined negative propeller torque being applied to said second coupling member, said torque responsive means including a helical spline on both of said second and intermediate coupling members, means for preventing ratcheting of said helical splines upon separation of said second and intermediate coupling members, said last mentioned means including an outer housing with a bore, a single fluid piston in said bore having an abutment engageable with said intermediate coupling member to define an axial reference surface for maintaining a drive couple between said first, second and intermediate coupling members under normal operation, spring means for holding said piston against said intermediate member to move therewith on initial decoupling movement thereof, said outer housing having a pressure balance passage to maintain equalized pressure across said piston under normal operation, means to block said passage in response to axial movement of said intermediate coupling member from a coupled relationship with said third coupling member and means for depressurizing one end of said piston when said passage is blocked to produce a pressure differential on said piston to cause said helical splines to be maintained completely decoupled in a non-ratchet position when said second and intermediate coupling members are separated from one another to disconnect the propeller gear box from the engine drive shaft.

3. A coupling assembly for separation of a propeller and reduction gear box from an engine drive shaft in response to a high negative propeller torque comprising: a first coupling member adapted to be connected to the engine drive shaft, a second coupling member adapted to be connected to the input to a reduction gear box for a propeller, an intermediate coupling member axially movable with respect to said first and said second coupling members, means for coupling said first and intermediate coupling members to permit axial movement therebetween while restraining relative rotation therebetween, torque responsive means for coupling said intermediate coupling member to said second coupling member to permit a controlled separation of said second and intermediate coupling members in response to a predetermined negative propeller torque being applied to said second coupling member, said torque responsive means including a helical spline on both of said second and intermediate coupling members, means for preventing ratcheting of said helical splines upon separation of said second and intermediate coupling members, said last mentioned means including an outer housing with a bore, a single fluid piston in said bore having an abutment engageable with said intermediate coupling member to define an axial reference surface for maintaining a drive couple between said first, second and intermediate coupling members under normal operation, spring means for holding said piston against said intermediate member to move therewith on initial decoupling movement thereof, said outer housing having a pressure balance passage to maintain equalized pressure across said piston under normal operation, means to block said passage in response to axial movement of said intermediate coupling member from a coupled relationship with said third coupling member and means for depressurizing one end of said piston when said passage is blocked to produce a pressure differential on said piston to cause said helical splines to be maintained completely decoupled in a non-ratchet position when said second and intermediate coupling members are separated from one another to disconnect the propeller gear box from the engine drive shaft, said depressurizing means including an exhaust port in said outer housing; a ball valve carried by said piston to cover said exhaust port during normal operation and to open said port when said piston follows said intermediate member during initial decoupling movement.

* * * * *